United States Patent [19]

Muraoka

[11] 3,873,945

[45] Mar. 25, 1975

[54] COMPRESSION AND EXPANSION SYSTEM USING A SUBTRACTION CIRCUIT

[75] Inventor: Teruo Muraoka, Sagamihara, Japan

[73] Assignee: Victor Company of Japan, Ltd., Yokohama, Kanagawa-ken, Japan

[22] Filed: June 25, 1974

[21] Appl. No.: 482,847

[30] Foreign Application Priority Data

June 28, 1973 Japan ............................... 48-72222

[52] U.S. Cl. ..................... 333/14, 325/65, 328/167, 330/145, 330/149

[51] Int. Cl. ............................................ H04b 1/64

[58] Field of Search ................ 333/14, 17; 179/1 P; 325/62, 65, 473, 477; 328/167, 168

[56] References Cited

UNITED STATES PATENTS

| | | | |
|---|---|---|---|
| 2,019,637 | 11/1935 | Shelleng | 333/14 |
| 3,518,578 | 6/1970 | Oppenheim et al. | 333/14 |
| 3,559,068 | 1/1971 | Almering et al. | 325/62 UX |

*Primary Examiner*—Paul L. Gensler

[57] ABSTRACT

A compression and expansion system comprises: a first frequency characteristic changing circuit for increasing the level of the high frequency band component of an input signal and carrying out compression; first subtraction circuit for carrying out subtraction operation of an input signal to the first frequency characteristic changing circuit and the output signal thereof; first frequency characteristic control circuit for supplying a control signal to the first frequency characteristic changing circuit in accordance with the output of the first subtraction circuit; second frequency characteristic changing circuit supplied with the output signal of the first frequency characteristic changing circuit transmitted through a transmission system and operating to decrease the level of the high frequency band component of this output signal and to carry out expansion; second subtraction circuit for carrying out subtraction operation of an input signal to the second frequency characteristic changing circuit and the output signal thereof; and second frequency characteristic control circuit for supplying a control signal to the second frequency characteristic changing circuit in accordance with the output of the second subtraction circuit. The subtraction circuit produces as output a signal which is equivalently of high-pass filtering characteristic of which cut-off frequency varies in accordance with the level of the input signal.

13 Claims, 14 Drawing Figures

COMPRESSION AND EXPANSION SYSTEM USING A SUBTRACTION CIRCUIT

BACKGROUND OF THE INVENTION

The present invention relates to a compression and/or expansion system and circuit and, more particularly, to a noise reduction system depending on a compression and/or expansion system for obtaining variable filtering characteristics through the use of a subtraction circuit.

Various compression/expansion systems wherein, in order to reduce noises in transmitted signals, compression is carried out by increasing the level in the high frequency band in the case where the level is low in accordance with the level of the input signal on the transmitting side, for example, a recording system, and expansion is carried out by accomplishing complementary level decreasing with the above mentioned compression on the receiving side, for example, a reproducing system, have been proposed.

In one example of a known compression/expansion system of this type, the compression system comprises a circuit for changing the frequency characteristic of the input signal, a filter circuit for filtering a required band component of the output signal of this frequency characteristic changing circuit, and a control circuit for controlling the frequency characteristic changing circuit in accordance with the output signal of the filter circuit. The expansion system in this compression/expansion system comprises a circuit for changing the frequency characteristic of the reproduced signal complementarily with the characteristic of the frequency characteristic changing circuit in the compression system, a filter circuit for filtering a required band component of the reproduced signal, and a control circuit for controlling the frequency characteristic changing circuit in accordance with the output signal of this filter circuit.

In an ordinary audio signal, the energy of the high frequency component is relatively low in comparison with that of the low frequency component, whereby the noise at high frequencies is especially discordant and unpleasant to the ear. For this reason, a high-pass filter circuit is used for the above mentioned filter circuit, and compression/expansion is carried out particularly with respect to the high band component of the signal.

In the case where the level of the low frequency component of the input signal is much higher than the level of the high frequencies, the high frequency signal component is modulated by the envelope of the low frequency signal, and, at the same time, the noise, itself, is also subjected to modulation. As a consequence, an unnecessary frequency component is produced in the vicinity of the high frequency component. This unnecessary frequency component is heard, by the auditory sense, as a mixed modulation noise of the high frequency band signal component and noise and becomes an extremely unpleasant sound. While this noise phenomenon differs with the kind of signal source, it is particularly pronounced to the ear in cases where the signal source is a piano music or the like.

Accordingly, in order to prevent the occurrence of an undesirable effect of this nature due to a low frequency component of high level, it is necessary to make steep the cut-off characteristic of the above mentioned high-pass filter. However, when the characteristic of this high-pass filter is determined with consideration of the above described matters, the energy of a signal passing through this filter decreases, and the sensitivity of the control circuit becomes poor, whereby it becomes impossible to accomplish satisfactory compression.

For this reason, it is desirable to construct the above mentioned high-pass filter as a variable frequency characteristic filter wherein the cut-off characteristic thereof can be varied in accordance with the level of the input signal. However, when an attempt is made to design a variable filter capable of varying its characteristic in accordance with signal level in this manner, its circuitry becomes excessively complicated and expensive.

SUMMARY OF THE INVENTION

Accordingly, it is a general object of the present invention to provide a novel and useful compression and/or expansion system and circuit in which the above described difficulties encountered heretofore have been overcome.

A specific object of the invention is to provide a system and circuit in which a filtering characteristic can be varied in accordance with the level of an input signal, an input signal to a control circuit producing as output a control signal for a frequency characteristic changing circuit being thereby obtained, and compression and expansion can be effectively carried out.

Another object of the invention is to provide a system and a circuit in which the circuit having the above mentioned variable filtering characteristic comprises a subtraction circuit, and, with a simple circuit, excellent compression/expansion can be accomplished.

Other objects and further features of the invention will be apparent from the following detailed description when read in conjunction with the accompanying drawings.

DETAILED DESCRIPTION

Figure 1:
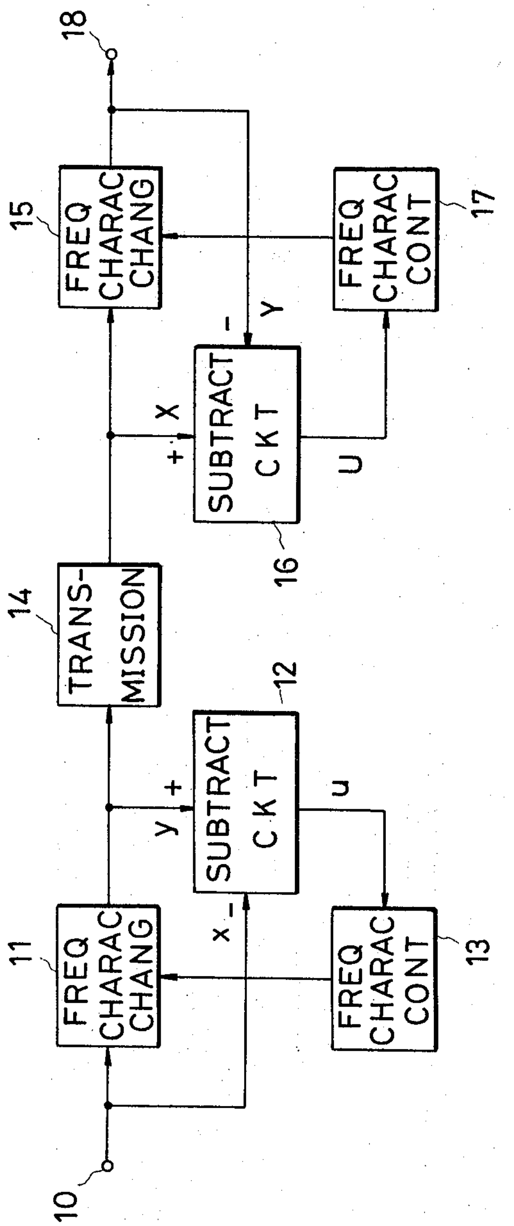
FIG. 1 is a block diagram showing the essential organization of one embodiment of a compression/expansion system according to the present invention.

Referring to FIG. 1 showing one embodiment of a compression/expansion system according to the invention, an input signal applied to an input terminal 10 is supplied to a frequency characteristic changing circuit 11. This circuit 11 is controlled by a control signal from a frequency characteristic control circuit 13 and accomplishes compression operation with respect to the input signal in a manner such as to increase the level at the high frequency band as the level of the input signal becomes lower.

The signal which has thus been compressed by the frequency characteristic changing circuit 11 is sent to a signal transmission system 14. The signal transmission system 14 comprises, for example, a recording/reproducing system including magnetic heads and a magnetic tape. In this case, the above compression system is provided in the recording system.

On one hand, the input signal $x$ introduced through the input terminal 10 is supplied as a subtrahend to a subtraction circuit 12. Furthermore, the output signal $y$ of the frequency characteristic changing circuit 11 is suppled as a minuend to the subtraction circuit 12. The subtraction circuit 12 carries out subtraction operation of the signals $y$ and $x$ to produce a subtraction output signal $u$ ($= y - x$).

This subtraction output signal has a variable high-pass filter frequency characteristic whereby the cut-off frequency thereof varies in accordance with the magnitude of the input signal level as described hereinafter. This subtraction output signal $u$ from the subtraction circuit 12 is supplied to a frequency characteristic control circuit 13. The output control signal of this control circuit 13 is supplied to the frequency characteristic changing circuit 11 and controls the frequency characteristic in a manner such that the level at the high frequency band is increased with decrease in the level of the input signal.

Figures 2A, 2B, 2C, 3A, 3B, 3C, 4A, 4B, 4C:
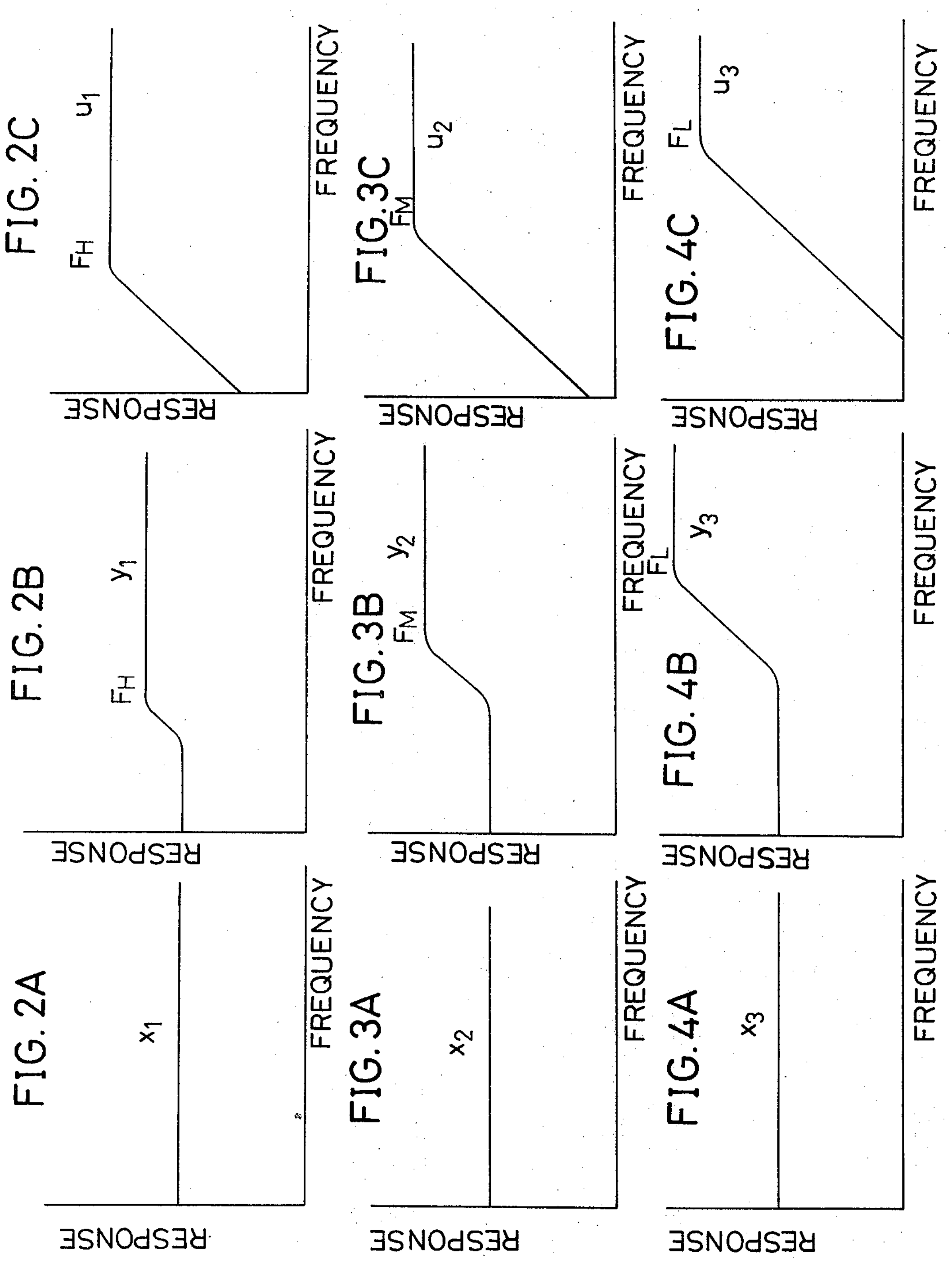
FIGS. 2A, 2B, and 2C are graphs respectively indicating the frequency-response characteristics of the output of a frequency characteristic changing circuit, and the output of a substraction circuit in the case where the level of the input signal of the system shown in FIg. 1 is relatively high.
FIGS. 3A, 3B, and 3C are similar graphs respectively indicating the same frequency-response characteristics as in FIGS. 2A, 2B, and 2C in the case where the level of the input signal of the system is of medium value.
FIGS. 4A, 4B, and 4C are similar graphs respectively indicating the same frequency-response characteristics as in FIGS. 2A, 2B, and 2C in the case where the level of the input signal is low.

In the case where the frequency characteristic of the input signal entering through the input terminal 10 is flat as indicated at $x_1$ in FIG. 2A and the level thereof is relatively high, the frequency-response characteristic of the output of the frequency characteristic changing circuit 11 becomes a characteristic to increase somewhat the level in its medium and high frequency band is indicated at $y_1$ in FIG. 2B. Furthermore, the frequency-response characteristic of the output of the subtraction circuit 12 becomes as indicated at $u_1$ in FIG. 2C.

In the case where the frequency characteristic of an input signal entering through the input terminal 10 is flat as indicated at $x_2$ in FIG. 3A and the level thereof is medium magnitude, the frequency-response characteristic of the output of the frequency characteristic changing circuit 11 becomes a characteristic to increase the level in its high frequency band as indicated at $y_2$ in FIG. 3B. Furthermore, the frequency-response characteristic of the output of the subtraction circuit 12 becomes as indicated at $u_2$ in FIG. 3C. The cut-off frequency $F_M$ of the high-pass filtering characteristic in FIG. 3C is higher than the cut-off frequency $F_H$ of the high-pass filtering characteristic in FIG. 2C.

In the case where the frequency characteristic of an input signal entering through the input terminal 10 is flat as indicated at $x_3$ in FIG. 4A and the level thereof is low, the frequency-response characteristic of the output of the frequency characteristic changing circuit 11 becomes a characteristic to increase the level in its high frequency band as indicated at $y_3$ in FIG. 4B. Furthermore the frequency-response characteristic of the output of the subtraction circuit 12 becomes as indicated at $u_3$ in FIG. 4C. The cut-off frequency $F_L$ of the high-pass filtering characteristics in FIG. 4C is higher than the cut-off frequency $F_M$ in FIG. 3C.

Figure 5:
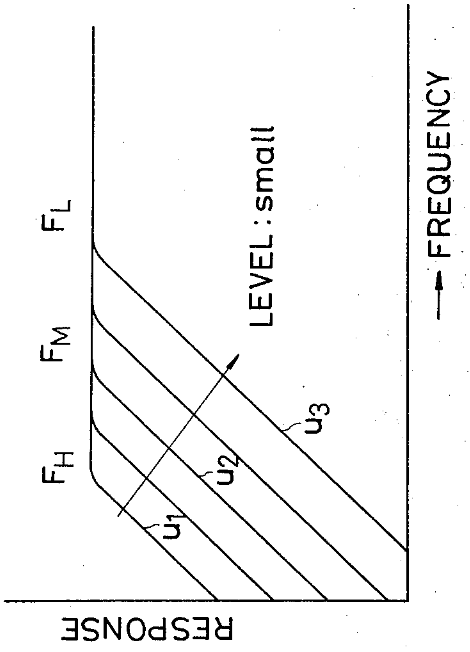
FIG. 5 is a graph indicating the frequency-response characteristc of the output of the substraction circuit.

The frequency-response characteristics of the output of the subtraction circuit 12 indicated in FIGS. 2C, 3C, 4C, etc., are shown in compiled form in FIG. 5, in which the input signal is assumed as a parameter, and the frequency-response characteristics $u_1$, $u_2$, $u_3$, etc., with respect to the input signals of decreasing level in the arrow direction are shown. The cut-off frequencies are $F_H < F_M < F_L$ as shown. As is apparent also from FIG. 5, an output signal of equivalently variable high-pass filtering characteristic of which cut-off frequency increases as its level decreases in accordance with the level of the input signal is obtained from the subtraction circuit 12.

Therefore, in order to obtain a signal for the control circuit 13, it is not necessary to use a variable high-pass filter circuit of complicated organization, but by merely using a substraction circuit, it is possible to obtain a signal of variable high-pass filtering characteristic.

Figure 6:
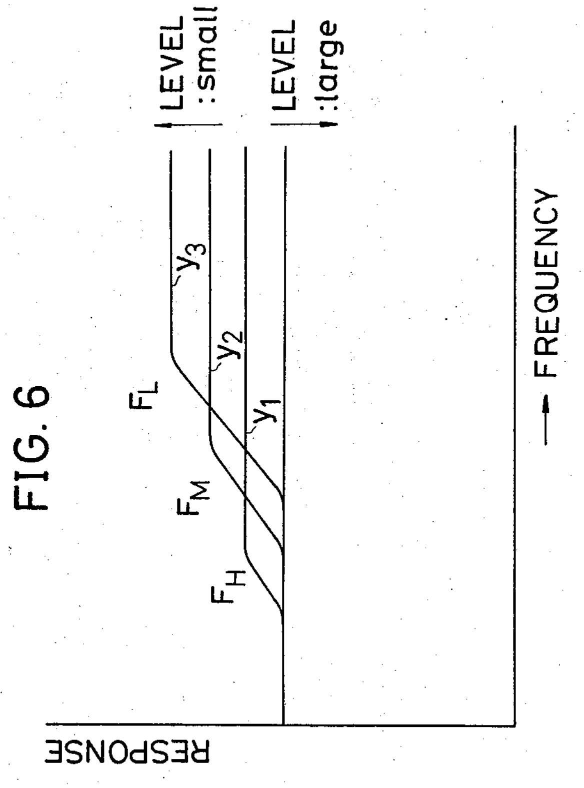
FIG. 6 is a graph indicating the frequency-response characteristic of the output of the frequency characteristic changing circuit.

In addition, the frequency-response characteristics $y_1$, $y_2$, $y_3$, etc., of the frequency characteristic changing circuit 11 may be indicated in compiled form as in FIG. 6. Accordingly, it will be understood the output signal of the frequency characteristic changing circuit 11 is compressed in accordance with the input signal level.

The signal which has been compressed by the frequency characteristic changing circuit 11 is transmitted by the signal transmission system 14 and sent to an expansion system provided in the reproducing system. This expansion system has an organization complementary to the above described compression system. The compressed signal thus transmitted is supplied to a frequency characteristic changing circuit 15 and a subtraction circuit 16. The frequency characteristic changing circuit 15 is controlled by a control signal from a frequency characteristic control circuit 17 and thereby carried out expansion operation with respect to the above mentioned signal thus transmitted in a manner to decrease the level of the high frequency band thereof with decrease in the level of the input signal.

The frequency characteristic changing circuit 15 thereupon carries out expansion operation complementarily with the compression operation of the aforedescribed frequency characteristic changing circuit 11 and decreases the increased level of the medium and high frequency band of the signal compressed as indicated in FIG. 6 and returns the characteristic again to a flat characteristic. The output signal of the frequency characteristic changing circuit 15 is led out through an output terminal 18 as a signal of reduced noise.

On one hand, this output signal of the frequency characteristic changing circuit 15 is supplied as a subtrahend Y to the subtraction circuit 16, while the signal transmitted by the above mentioned transmission system 14 is supplied as a minuend X to the subtraction circuit 16. The subtraction circuit 16 carries out subtraction of these signals X and Y to produce a subtraction output signal U ($= X - Y$), which is supplied to the frequency characteristic control circuit 17.

The frequency characteristic changing circuits 11 and 15, the subtraction circuits 12 and 16, and the frequency characteristic control circuits 13 and 17 are respectively organized by the same circuit construction with each other.

In an actual circuit, an arrangement wherein the frequency characteristic changing circuits 11 and 15, the subtraction circuits 12 and 16, and the frequency characteristic control circuits 13 and 17 are respectively used commonly with each other, and the input signals to the subtraction circuit 12 (16) are changed over in accordance with whether all circuits are used as a compression system or are used as an expansion system.

Furthermore, while the input signals $x$ and $y$ of the subtraction circuit 12 are caused to have negative and positive polarities, respectively, and the input signals X and Y of the subtraction circuit 16 are caused to have positive and negative polarities, respectively, in the above described embodiment, these polarities may be reversed depending on the circuit design of the control circuits 13 and 17.

Figure 7:
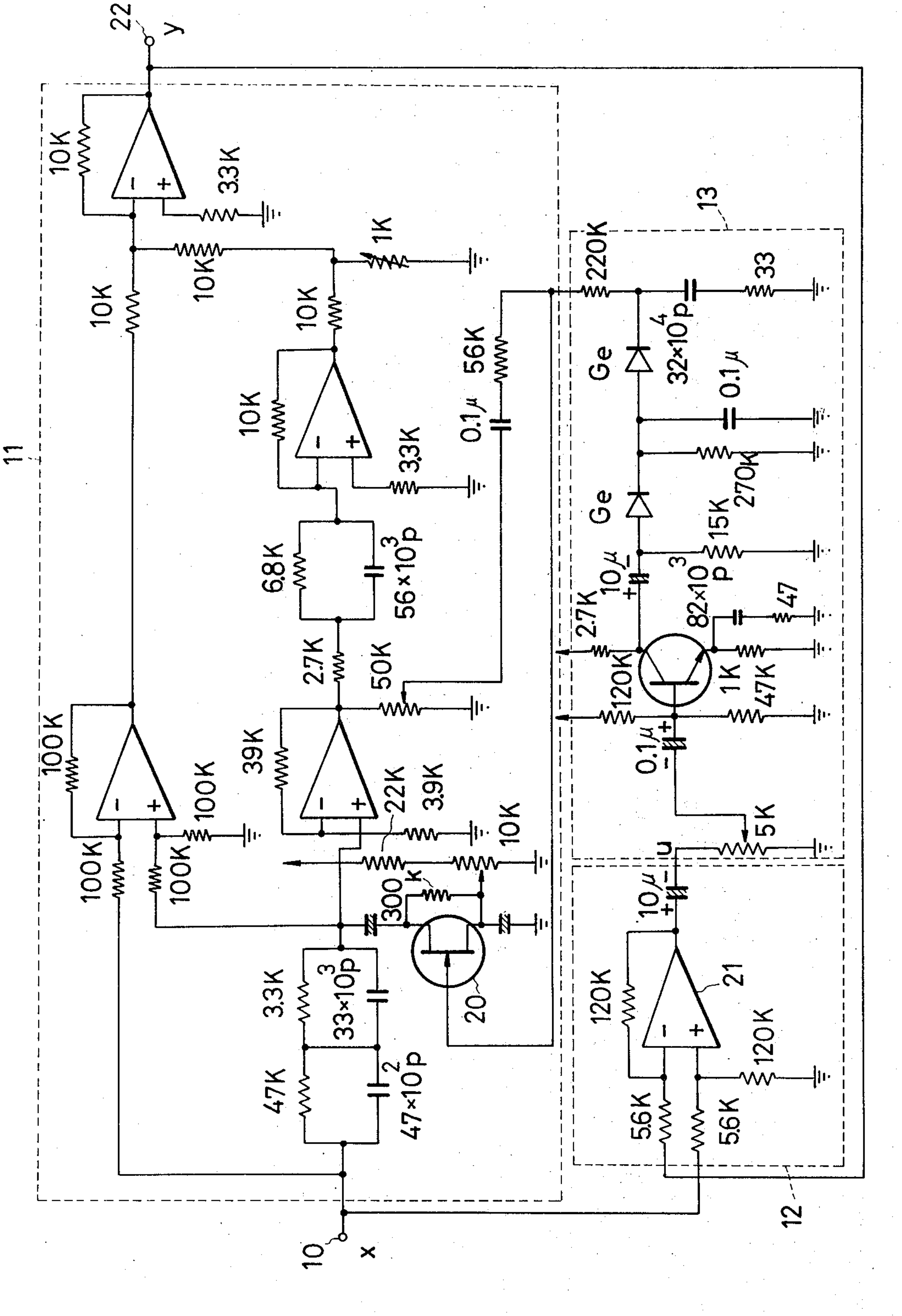
FIg. 7 is a circuit diagram of one embodiment of a specific circuit of the compression system.

One embodiment of a specific circuit in concrete form of the compression system shown in the form of a block diagram in FIG. 1 is shown in FIG. 7. In FIG. 7, circuit parts which are the same as corresponding blocks in FIG. 1 are enclosed by intermittent lines and designated by like reference numerals. A field effect transistor (FET) 20 in the frequency characteristic changing circuit 11 receives at its gate the output of the frequency characteristic control circuit 13 as a control voltage. The FET 20 changes of its internal impedance and changes the frequency characteristic, as indicated in FIG. 6, of a signal passing through the circuit 11 in a manner to increase the level of the high frequency band of the signal in accordance with the control voltage applied to the above mentioned gate of the FET 20.

The subtraction circuit 12 comprises an IC differential amplifier 21. The input terminal on the plus side of the subtraction circuit 12 is connected to the input terminal 10 and is supplied with a signal $x$, while the input terminal on the minus side is connected to the output side of the frequency characteristic changing circuit 11 and is supplied with the signal $y$. The subtraction circuit 12 carries out a subtraction operation (signal $x-$ signal $y$) to produce an output signal $u$ and to supply this signal $u$ to the frequency characteristic control circuit 13. The frequency characteristic control circuit 13 rectifies this output signal $u$ of the subtraction circuit 12 and forms a control signal with respect to the FET 20 in the frequency characteristic changing circuit 11.

Figure 8:
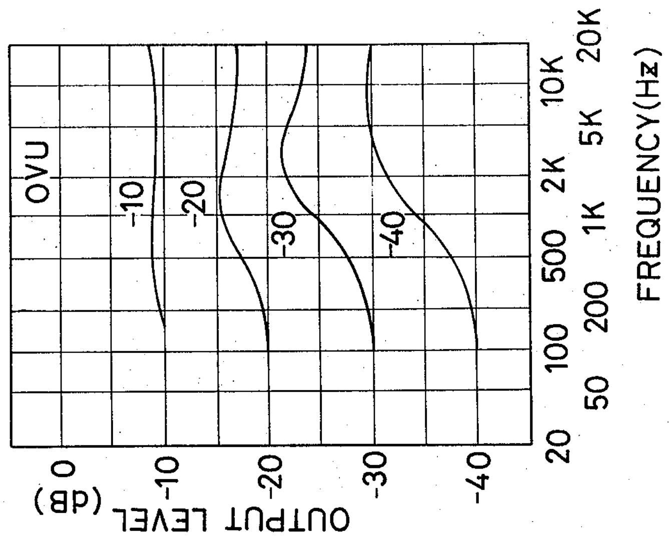
FIG. 8 is a graph indicating the frequency-level characteristic of the output of the circuit illustrated in FIG. 7.

The frequency-level characteristic of the compressed output signal of the frequency characteristic changing circuit 11 led out through an output terminal 22 is indicated in FIG. 8.

Further, this invention is not limited to these embodiments but various variations and modifications may be made without departing from the scope and spirit of the invention.

What is claimed is:

1. A compression system comprising: frequency characteristic changing means for changing the frequency characteristic thereof in a manner such that, with respect to an input signal, the level of the high frequency band signal thereof is relatively increased as the level of the input signal is low; subtraction means for carrying out subtraction operation of an input to the frequency characteristic changing means and the output signal of said frequency characteristic changing means; and frequency characteristic control means supplied with the resulting output of the subtraction means and operating to supply a control signal for changing the frequency characteristic to the frequency characteristic changing means, said subtraction means producing as output a signal of equivalently high-pass filtering characteristic of which cut-off frequency varies in accordance with the level of the input signal.

2. An expansion system for expanding a transmitted signal compressed by the compression system according to claim 1, comprising: second frequency characteristic changing means for changing the frequency characteristic thereof in a manner to cause a decrease relatively in the level of the high frequency band signal of the signal thus transmitted; second subtraction means for carrying out subtraction operation of an input signal to the second frequency characteristic changing means and the output signal of said second frequency characteristic changing means; and second frequency characteristic control means supplied with the resulting output of the second subtraction means and operating to supply a control signal for changing the frequency characteristic to the second frequency characteristic changing means.

3. A compressing and expansion system comprising:

first frequency characteristic changing means for changing the frequency characteristic thereof in a manner such that, with with respect to an input signal, the level of the high frequency band signal thereof is relatively increased as the level of the input signal is low;

first subtraction means for carrying out subtraction operation of an input signal to the first frequency characteristic changing means and the output signal of said frequency characteristic changing means;

first frequency characteristic control means supplied with the resulting output of the first subtraction means and operating to supply a control signal for changing the frequency characteristic to the first frequency characteristic changing means;

second frequency characteristic changing means for changing the frequency characteristic thereof in a manner to cause a decrease relatively in the level of the high frequency band signal of a signal produced as output and transmitted from the first frequency characteristic changing means;

second subtraction means for carrying out subtraction operation of an input signal to the second frequency characteristic changing means and the output signal of said second frequency characteristic changing means; and second frequency characteristic control means supplied with the resulting output of the second subtraction means and operating to supply a control signal for changing the frequency characteristic to the second frequency characteristic changing means, said first and second subtraction means producing respectively as output signals which are equivalently of high-pass filtering characteristic of which cut-off frequencies vary in accordance with the level of the input signal.

4. A compression circuit comprising: a frequency characteristic changing circuit for changing the frequency characteristic thereof in a manner such that, with respect to an input signal, the level of the high frequency band signal thereof is relatively increased as the level of the input signal is low; a subtraction circuit for carrying out subtraction operation of an input to the frequency characteristic changing circuit and the output of said frequency characteristic changing circuit; and a frequency characteristic control circuit supplied with the resulting output of the subtraction circuit and operating to supply a control signal for changing the frequency characteristic to the frequency characteristic changing circuit, said subtraction circuit producing as output a signal of equivalently high-pass filtering characteristic of which cut-off frequency varies in accordance with the level of the input signal.

5. A compression circuit as claimed in claim 4 in which said subtraction circuit comprises a differential amplifier having two input terminals and supplied respectively through the input terminals with the input and output of the frequency characteristic changing circuit.

6. A compression circuit as claimed in claim 5 in which said frequency characteristic control circuit includes a rectifying circuit for rectifying the output of the differential amplifier and supplying the resulting rectified output thereof to the frequency characteristic changing circuit.

7. A compression circuit as claimed in claim 4 in which said frequency characteristic changing circuit has a field-effect transistor having a gate to which is applied the output control signal of the frequency characteristic control circuit whereby the internal impedance thereof is varied, and which changes the frequency characteristic of the input signal.

8. An expansion circuit for expanding a transmitted signal compressed by the compression circuit according to claim 4, comprising: second frequency characteristic changing circuit for changing the frequency characteristic thereof in a manner to cause a decrease relatively in the level of the high frequency band signal of the signal thus transmitted; second subtraction circuit for carrying out subtraction operation of an input signal to the second frequency characteristic changing circuit and the output signal of said second frequency characteristic changing circuit; and second frequency characteristic control circuit supplied with the resulting output of the second subtraction circuit and operating to supply a control signal for changing the frequency characteristic to the second frequency changing circuit.

9. An expansion circuit as claimed in claim 8 in which said second subtraction circuit comprises a second differential amplifier having two input terminals and supplied respectively through the input terminals with the input and output of the second frequency characteristic changing circuit.

10. An expansion circuit as claimed in claim 9 in which said second frequency characteristic control circuit includes a second rectifying circuit for rectifying the output of the second differential amplifier and supplying the resulting rectified output thereof to the second frequency characteristic changing circuit.

11. An expansion circuit as claimed in claim 8 in which said second frequency characteristic changing circuit has a second field-effect transistor having a gate to which is applied the output control signal of the second frequency characteristic control circuit whereby the internal impedance thereof is varied, and which changes the frequency characteristic of the input signal.

12. A compressing and expansion circuit comprising:

first frequency characteristic changing circuit for changing the frequency characteristic thereof in a manner such that, with respect to an input signal, the level of the high frequency band signal thereof is relatively increased as the level of the input signal is low;

first subtraction circuit for carrying out subtraction operation of an input signal to the first frequency characteristic changing circuit and the output signal of said frequency characteristic changing circuit;

first frequency characteristic control circuit supplied with the resulting output of the first subtraction circuit and operating to supply a control signal for changing the frequency characteristic to the first frequency characteristic changing circuit;

second frequency characteristic changing circuit for changing the frequency characteristic thereof in a manner to cause a decrease relatively in the level of the high frequency band signal of a signal produced as output and transmitted from the first frequency characteristic changing circuit;

second subtraction circuit for carrying out subtraction operation of an input signal to the second frequency characteristic changing circuit and the output signal of said second frequency characteristic changing circuit; and second frequency characteristic control circuit supplied with the resulting output of the second subtraction circuit and operating to supply a control signal for changing the frequency characteristic to the second frequency characteristic changing circuit, said first and second subtraction circuits producing respectively as output signals which are equivalently of high-pass filtering characteristic of which cut-off frequencies vary in accordance with the level of the input signal.

13. A compression and expansion circuit as defined in claim 12 in which said second frequency characteristic changing circuit has substantially the same circuit construction as the first frequency characteristic changing circuit, said second subtraction circuit has substantially the same circuit construction as the first subtraction circuit, and said second frequency characteristic control circuit has substantially the same circuit construction as the first frequency characteristic control circuit.

* * * * *